United States Patent
Katoh et al.

[11] Patent Number: 5,997,110
[45] Date of Patent: *Dec. 7, 1999

[54] CORE METAL FOR RUBBER CRAWLER

[75] Inventors: Yusaku Katoh; Tuyoshi Uchiyama, both of Hiroshima-ken, Japan

[73] Assignee: Fukuyama Gomu Kogyo Kabushiki Gaisha, Hiroshima-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,312

[22] Filed: Apr. 8, 1997

[51] Int. Cl.$^6$ .................................................. B62D 55/24
[52] U.S. Cl. ........................................ 305/169; 305/173
[58] Field of Search .................................. 305/169, 165, 305/171, 172, 173, 174, 175, 177

[56] References Cited

U.S. PATENT DOCUMENTS 5,813,733  9/1998  Hori et al. ........................... 305/174 X

FOREIGN PATENT DOCUMENTS

| | | | |
|---|---|---|---|
| 55-55065 | 4/1980 | Japan | 305/169 |
| 61-122085 | 6/1986 | Japan | 305/169 |
| 1-223086 | 9/1989 | Japan | 305/169 |
| 1-266080 | 10/1989 | Japan | 305/174 |
| 3070687 | 3/1991 | Japan | 305/373 |
| 4243675 | 8/1992 | Japan | 305/169 |
| 4-342680 | 11/1992 | Japan | 305/177 |

*Primary Examiner*—Russell D. Stormer
*Attorney, Agent, or Firm*—Lane, Aitken & McCann, L.L.P.

[57] ABSTRACT

A metal core for a rubber crawler, wherein an engaging part with a sprocket is provided at the center thereof, wherein horn members are provided at the outsides of the engaging part, wherein right and left wing parts are provided at the outsides of the horn members, wherein concave parts are formed by intercepting the engaging part lengthwise and crosswise by a rib, and wherein inner surfaces of the right and left horn members are inclined at a fixed angle to the wing portion of the metal core in a top view.

4 Claims, 9 Drawing Sheets

CORE METAL FOR RUBBER CRAWLER

FIELD OF THE INVENTION

The present invention relates to a metal core for embedding in a rubber crawler, and particularly a metal core which is excellent in discharging sand.

BACKGROUND OF THE INVENTION

Figure 9:
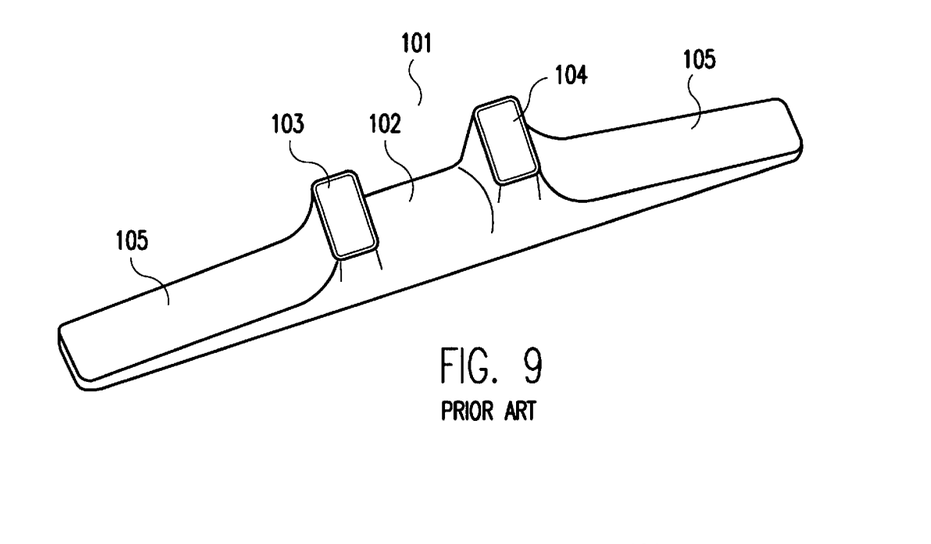
FIG. 9 is a perspective view showing a conventional metal core for a rubber crawler.
Figure 10A:
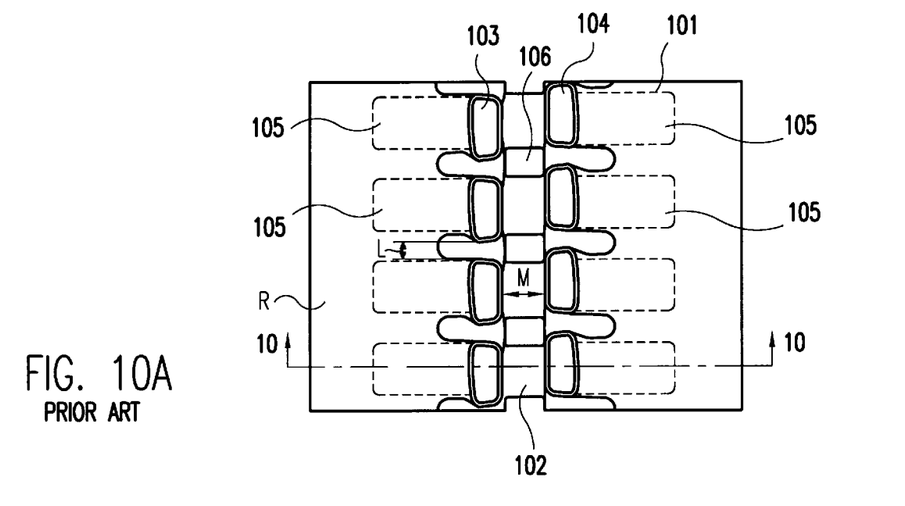
FIG. 10A is a plan view of a rubber crawler, wherein the metal cores of FIG. 9 are embedded.
Figure 10B:
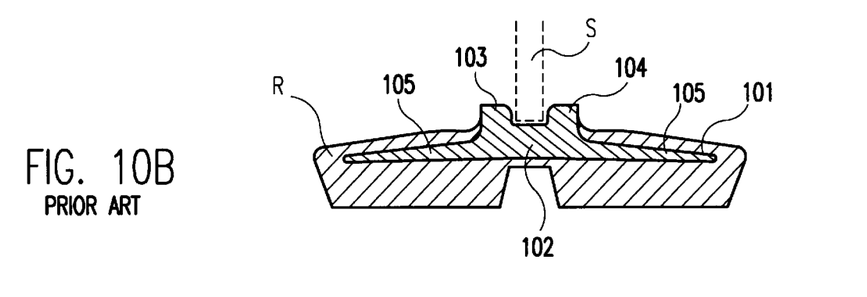
FIG. 10B is a sectional view taken along the line 10—10 in FIG. 10A.

FIGS. 9 and 10 show a conventional metal core for a rubber crawler and a rubber crawler in which a plurality of the conventional metal cores are embedded. As shown in FIG. 9, a metal core 101 comprises an engaging part 102 provided at the center thereof for engaging a sprocket, roughly rectangular horn members 103, 104 provided laterally outside the engaging part 102, and right and left wing portions 105, 105 extending at the outsides of the horn members 103, 104. A plurality of the metal cores 101 are embedded at a fixed interval, with the horn members 103, 104 protruding out of rubber material R. An engaging hole 106 in which a sprocket tooth is inserted for transmitting driving force is provided between the adjacent metal cores 101, at the middle of the width direction.

When a rubber crawler travels on uneven ground, sand is taken in on the inner circumference of the rubber crawler. In the conventional rubber crawler, sand is hardly discharged to the outside, because an interval L between adjacent metal cores and an engaging hole 106 are both small. Especially, sand often stays at a space M between horn members 103, 104, because the space M engages with a sprocket s with a slight gap. When the sprocket s engages the engaging part 102 of the metal core, sand is stamped down therebetween, and stored up on the engaging part 102. In consequence, the circumference of the rubber crawler is elongated by the stored sand, thereby causing excess tension thereon. This breaks steel cords and disables the rubber crawler from traveling. Besides it has bad effects on the machine.

SUMMARY OF THE INVENTION

It is therefore an object of this invention to prevent sand from staying on the inner circumference of a rubber crawler and to provide a rubber crawler which is excellent in discharging sand.

To achieve the above objects, the present invention is characterized by a metal core having an engaging part provided at the center thereof for engaging a sprocket, horn members provided laterally outside the engaging part, and right and left wing parts extending at the outsides of the horn members, the engaging part and the horn members having excellent forms for discharging sand.

Specifically, the engaging part is ridged lengthwise and crosswise by a rib so as to form concave parts there. Besides, inner surfaces of the right and left horn members are inclined in a top view. For example, the horn member has a roughly trapezial shape comprising a short length on the engaging side and a long length on the wing side, or the inner surfaces are partially inclined, or the right and left horn members project backward and forward, respectively. Moreover, in combination with the concave parts and the forms of the horn members, the metal core becomes suitable for discharging sand.

Since the engaging part of the metal core is topped by a rib, and concave parts are formed there, the contact pressure of the engaging part with a sprocket becomes small. Accordingly, sand in the inner circumference of the crawler moves to the concave parts without being stamped down between the engaging part and the sprocket during traveling. Moreover, sand is discharged through an engaging hole, thereby preventing sand from being stored up on the engaging part.

Since the inner surfaces of the right and left horn members of the metal core are inclined in a top view, the interval between the right and left horn members (the width of the engaging part) is wide. Therefore, the sprocket can engage the metal core with a sufficient space at the interval between the horn members. Besides, sand can be smoothly discharged to the outside along the inclined inner surfaces, thereby increasing the flowability of the sand and preventing sand from being stored up on the engaging part.

Since the horn member has a roughly trapezial shape comprising a short length on the engaging side and a long length on the wing side, or the inner surfaces are partially inclined, or the right and left horn members project backward and forward, respectively, the metal core is excellent in discharging sand while keeping effects such as the horn members preventing wheels from coming off the crawler and decreasing vibrations.

Since sand on the inner circumference of the crawler can be easily discharged outside through the concave parts of the engaging part or the interval between the horn members of the metal core, sand is not stored up between the sprocket and the engaging part, thereby causing no excess tension on the rubber crawler. Accordingly, durability of the rubber crawler is increased, and the machine is protected, thereby enabling long and smooth traveling of the crawler.

DETAILED DESCRIPTION OF PREFERRED EMBODIMENTS

Figure 1A:
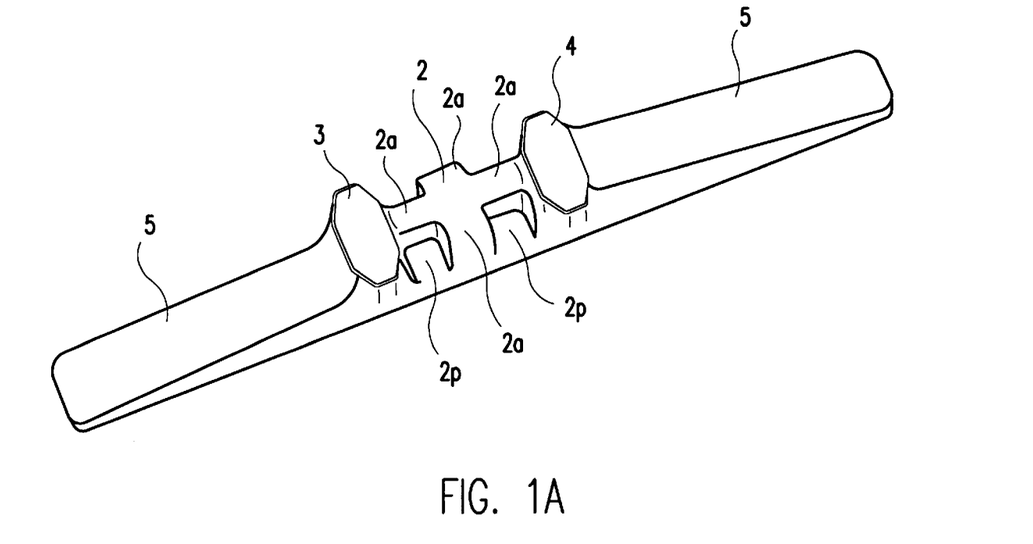
FIG. 1A is a perspective view of a first embodiment of a metal core for a rubber crawler.
Figure 1B:
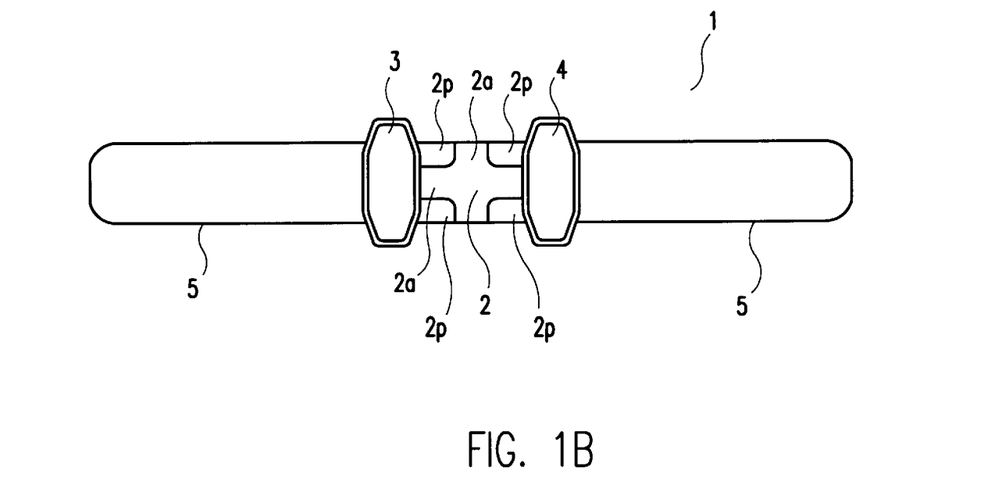
FIG. 1B is a plan view of the metal core of FIG. 1A.

FIGS. 1A and 1B show a metal core for a rubber crawler in a first embodiment of this invention. FIG. 1A is a perspective view, and FIG. 1B is a plan view. In these figures, an engaging part 2 is provided at the center of a metal core 1. Horn members 3, 4 are provided at the outsides of the engaging part 2. The horn members 3, 4 function as a traveling surface when traveling on a rotating wheel, and they prevent the rotating wheel from coming off the crawler. Besides, right and left wing portions 5, 5 are provided at the outsides of the horn members 3, 4. The engaging part 2 is intercepted by a cross-shaped rib 2a so as to form a concave part 2p at every corner of the engaging part 2, that is, a concave part is in every portion of the engaging part except the ribs 2a, 2b, in order to increase the flowability of sand between the horn members 3 and 4.

Figure 2A:
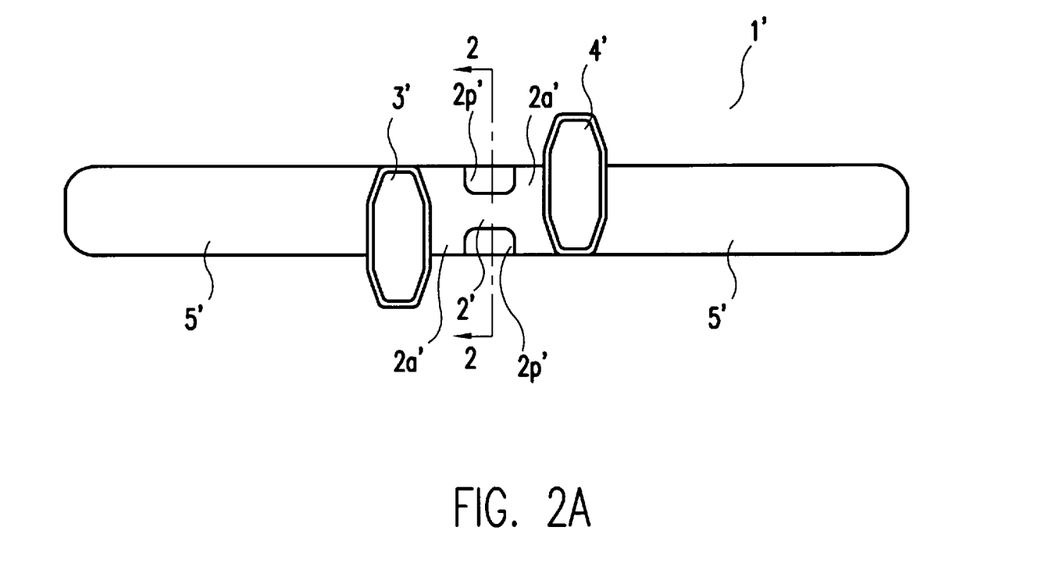
FIG. 2A is a plan view of a modified example of the first embodiment.
Figure 2B:
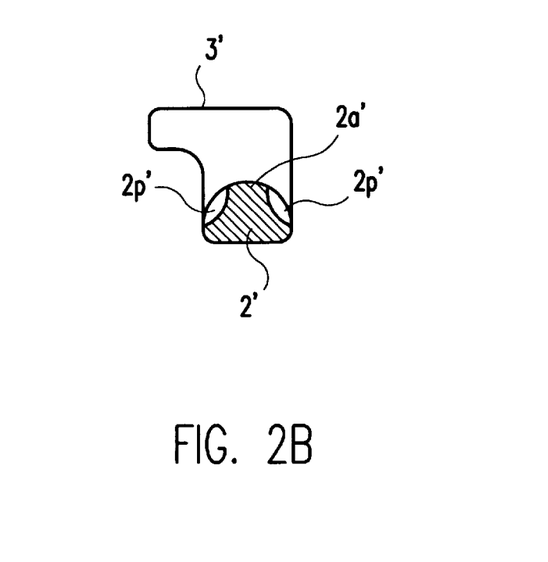
FIG. 2B is a center sectional view, taken along the line 2—2 in FIG. 2A.

FIGS. 2A and 2B show a metal core for a rubber crawler which is modified from the first embodiment. FIG. 2A is a plan view, and FIG. 2B is a center sectional view. While in the first embodiment a concave part 2p is formed at every corner of the engaging part 2, in this embodiment an engaging part 2' is intercepted by an H-shaped rib 2a' so as to form two concave parts 2p' there. In this case, right and left horn members 3', 4' can project backward and forward, respectively.

Figure 3A:
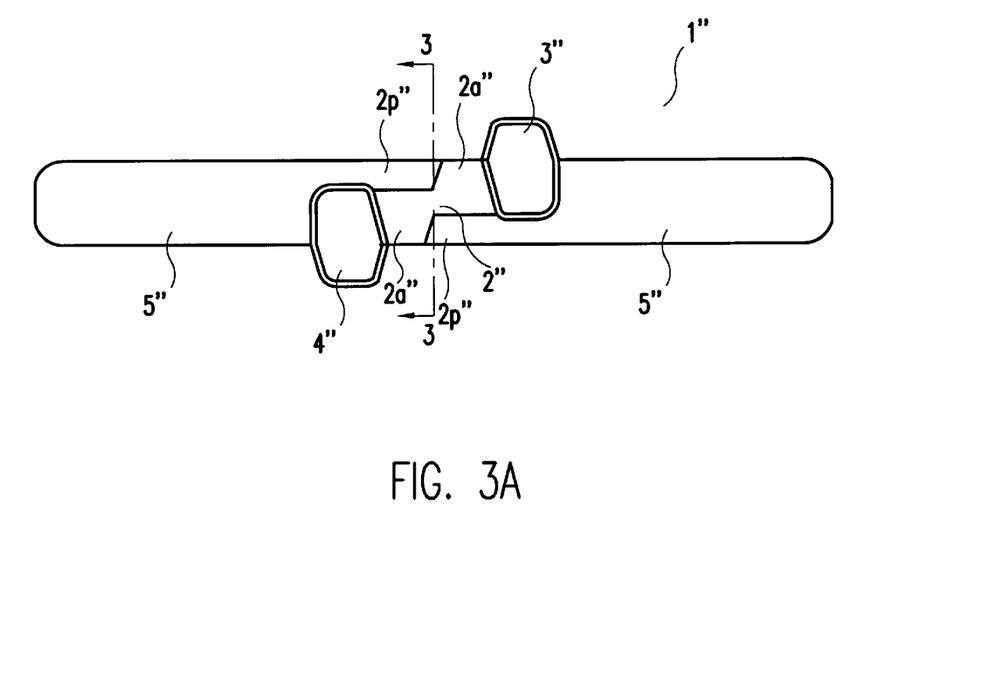
FIG. 3A is a plan view of another modified example of the first embodiment.
Figure 3B:
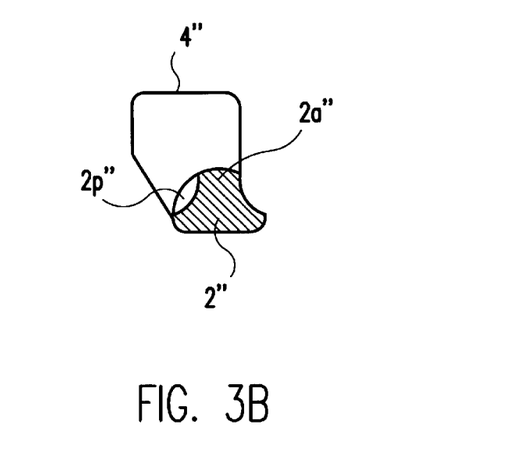
FIG. 3B is a center sectional view taken along the line 3—3 in FIG. 3A.

FIGS. 3A and 3B show another modified metal core for a rubber crawler. FIG. 3A is a plan view, and FIG. 3B is a center sectional view. In this embodiment, an engaging part is provided with a stepped rib 2a" so as to form two concave parts 2p' in zigzag. The ends of the horn members 3", 4" adjacent to each concave part 2" are lacking in order to further increase the dischargeability of sand.

Figure 4A:
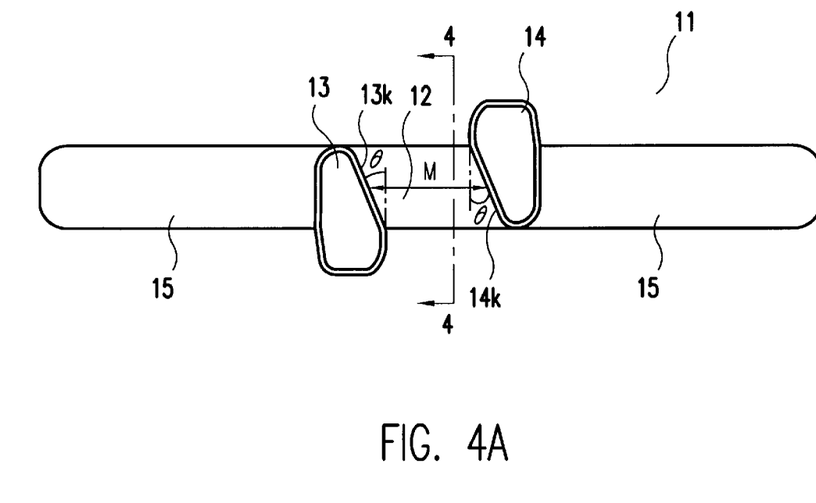
FIG. 4A is a plan view of a second embodiment of a metal core for a rubber crawler.
Figure 4B:
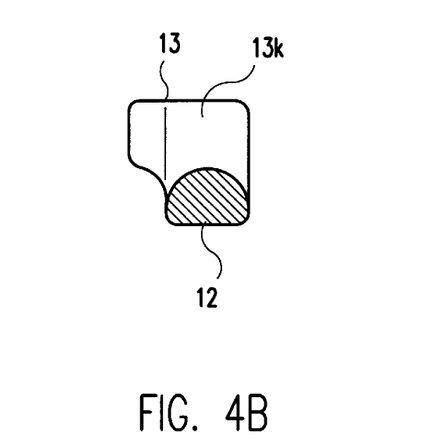
FIG. 4B is a center sectional view taken along the line 4—4 in FIG. 4A.

FIGS. 4A and 4B show a second embodiment of a metal core 11 for a rubber crawler according to this invention. FIG. 4A is a plan view, and FIG. 4B is a center cross-sectional view. In this embodiment, horn members 13, 14 have inner surfaces 13k, 14k, respectively, which are inclined at a fixed angle θ to each wing portion 15, so that the horn members 13, 14, being in point symmetry, each have a trapezial shape in a top view. Besides, the trapezial horn members are provided so as to partially protrude backward and forward, respectively, in the width direction of the wing portion 15. An interval between the horn members 13 and 14, namely the width M of the engaging part 12, is wide, thereby providing a sufficient space for engagement with a sprocket, and increasing the flowability of sand. Besides, since the inner surfaces 13k, 14k are inclined relative to each wing portion 15 of the metal core 11, specifically, relative to the side of the rubber crawler, sand between the horn members can be easily discharged along the inclined surfaces.

Figure 5A:
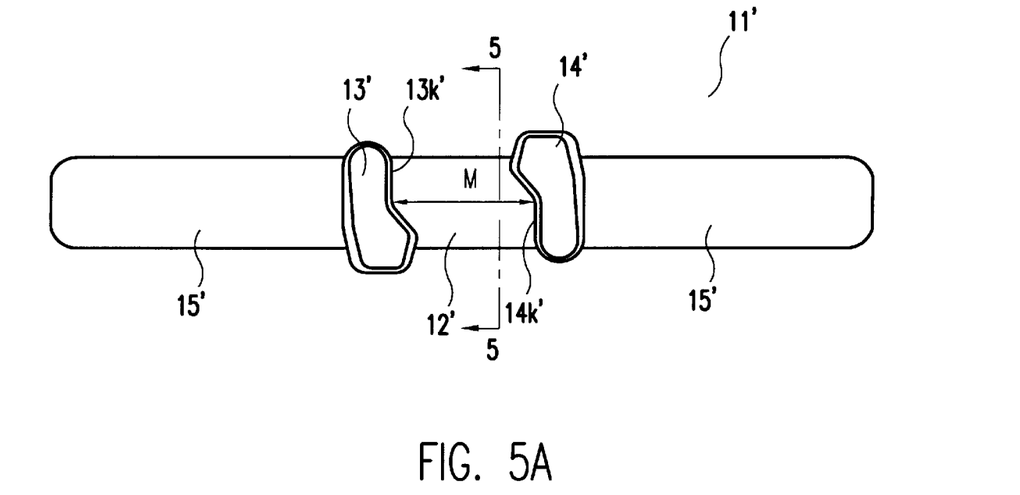
FIG. 5A is a plan view of a third embodiment of a metal core for a rubber crawler.
Figure 5B:
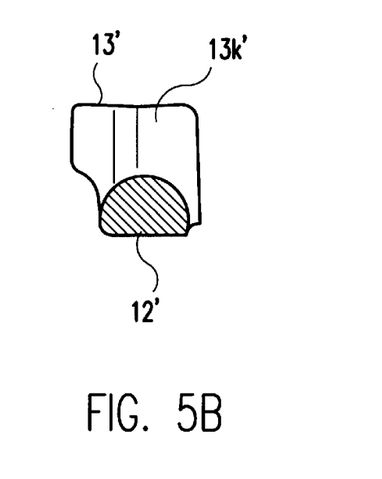
FIG. 5B is a center sectional view taken along the line 5—5 in FIG. 5A.

FIG. 5A is a plan view of a third embodiment of a metal core for a rubber crawler according to this invention, and FIG. 5B is a center cross sectional view. In this embodiment, horn members 13', 14' have inner surfaces 13k', 14k', respectively, which are inclined twice. In this embodiment, the width M of an engaging part of the metal core is also wide in comparison with a conventional example, thereby increasing dischargeability of sand.

Figure 6A:
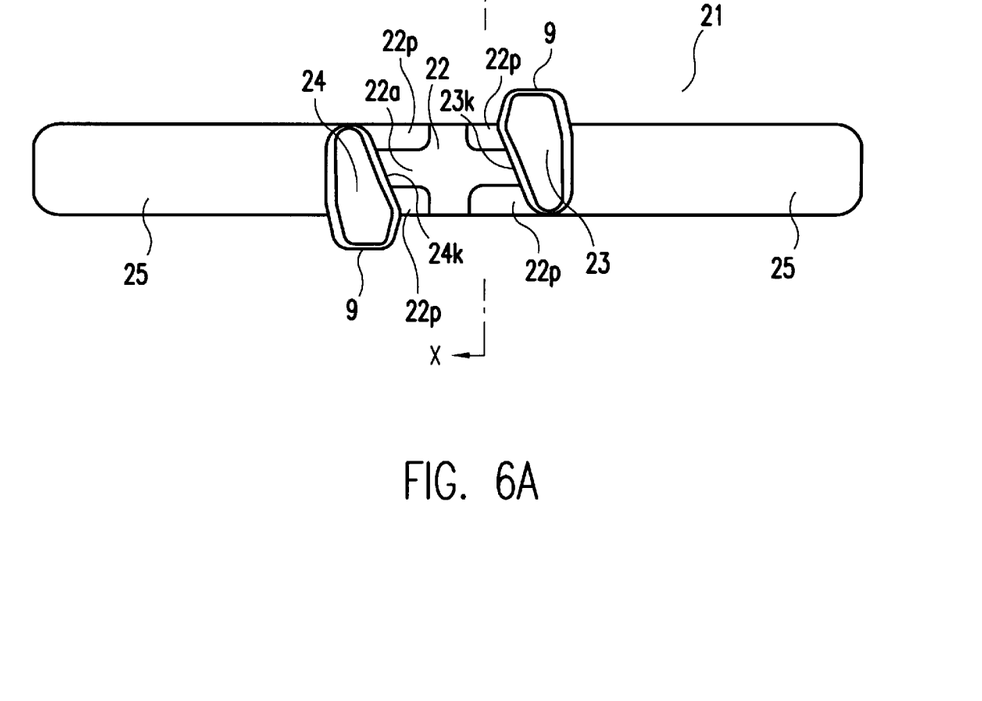
FIG. 6A is a plan view of a fourth embodiment of a metal core for a rubber crawler.
Figure 6B:
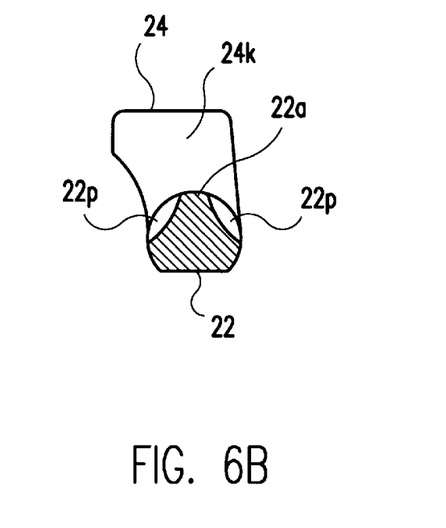
FIG. 6B is a cross sectional view taken along the line X—X in FIG. 6A.

FIG. 6A is a plan view of a fourth embodiment of a metal core of a rubber crawler according to this invention, and FIG. 6B is a sectional view cut along the line X—X of FIG. 6A. In this embodiment, an engaging part 22 is provided at the center of the metal core 21. The engaging part 22 is intercepted by a cross-shaped rib 22a so as to form a concave part 22p which has an arcuate cross section. Horn members 23, 24 are provided at the opposite sides of the engaging part 2. The horn members 23, 24 function as traveling surfaces when passing on a rotating wheel, and prevent the wheel from coming off the crawler. The horn members 23, 24 have inner surfaces 23k, 24k, respectively, which are inclined at a fixed angle to the longitudinal width direction of the metal core, so that the horn members 23, 24, being in point symmetry, each have a trapezial shape in a top view. Besides, the trapezial horn member 23, 24 are provided so that the tip or the back end g (in this figure, the back end g) slightly protrudes backward and forward, respectively, in the width direction of a wing portion 25.

Figure 7:
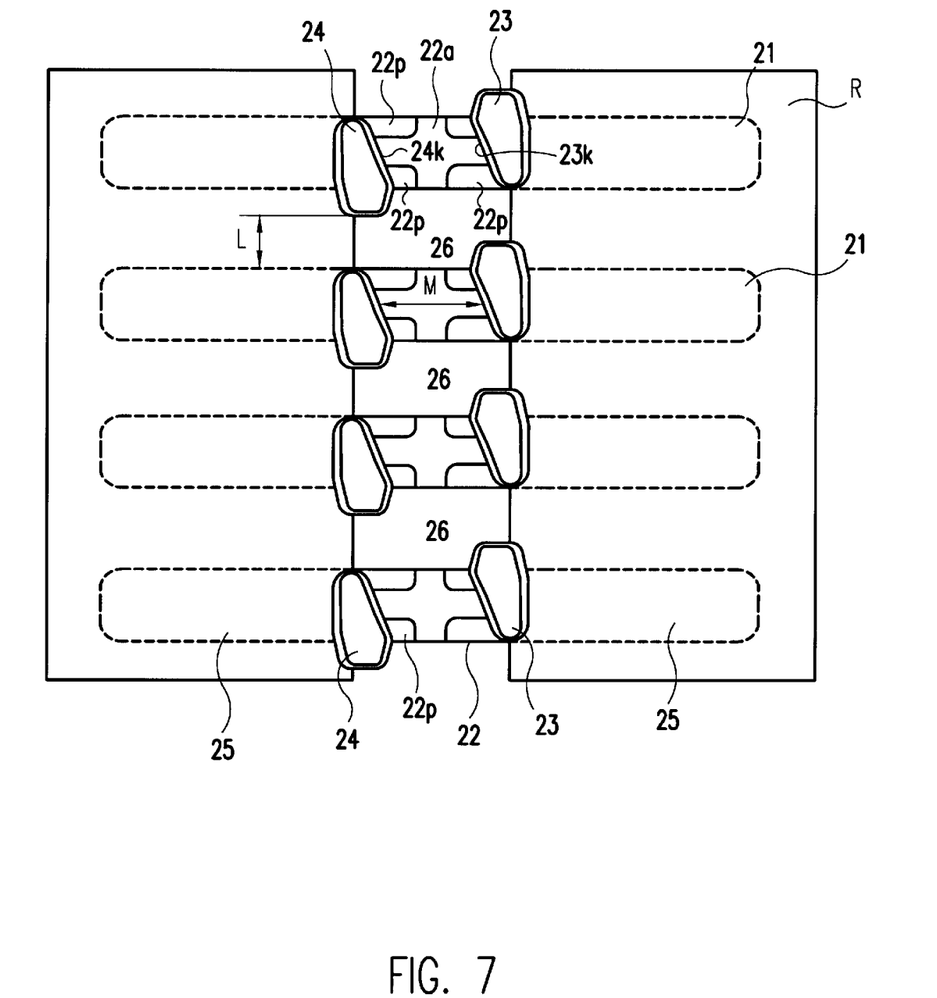
FIG. 7 is a plan view showing a rubber crawler, wherein metal cores disclosed in FIG. 6 are embedded in rubber material at a fixed interval.

FIG. 7 is a plan view of a rubber crawler wherein the metal cores 21 are embedded in rubber material at a fixed interval. In this rubber crawler, since an interval M between the right and left horn members is wide, a sprocket can engage with the engaging part 22 with a sufficient space, thereby increasing the flowability of sand therebetween. Besides, sand in the engaging part 22 moves into the concave parts 22p and is easily discharged through an interval L between adjacent horn members or through an engaging hole 26. Moreover, sand can smoothly move to the sides of the rubber crawler or the ground along the inclined inner surfaces 23k, 24k.

Figure 8:
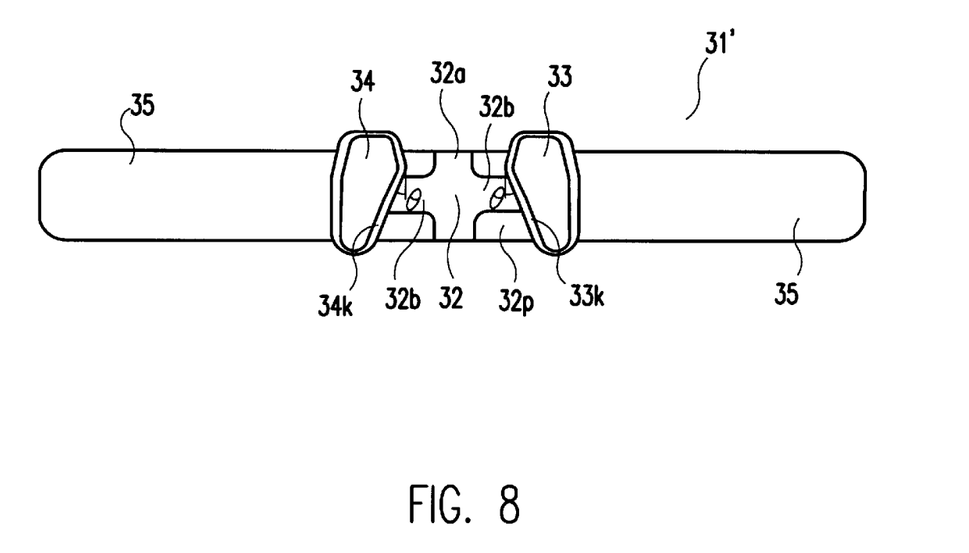
FIG. 8 is a plan view showing a metal core for a rubber crawler modified from the metal core of FIG. 1.

FIG. 8 is a plan view of a metal core 31' having wing portions 35 for a rubber crawler, the metal core being modified from that disclosed in FIG. 1. As is shown in FIG. 8, an engaging part 32 is also intercepted by a cross-shaped rib 32a so as to form a concave part 32p there. Besides, right and left horn members 33, 34 have inner surfaces 33k, 34k, respectively. Each of the inner surfaces 33k, 34k is inclined at a fixed angle θ so that the right and left horn members are in a symmetrical spaced and angled position, thereby having the same effects.

The present invention is not limited to the above-mentioned embodiments, but includes a metal core having an excellent form (not illustrated) for discharging sand, such as a metal core 1' disclosed in FIGS. 2A and 2B, wherein inner surfaces of the horn members 3', 4' are inclined at a fixed angle θ as shown in FIG. 4A or 8, or double inclined as shown in FIG. 5A, or a metal core 11' disclosed in FIG. 5A, wherein the engaging part 12' is provided with concave parts as shown in FIGS. 1A and 1B, 2A and 2B, or 3A and 3B.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

We claim:

1. A metal core for a rubber crawler comprising:
   a sprocket-engaging part at the center of the metal core for engaging a sprocket, the metal core defining a length, and said sprocket-engaging part having a top and being semicircular in cross-section transverse to said length;
   horn members positioned laterally outside said sprocket-engaging part;
   wing parts extending laterally from outside said horn members;
   a rib integral with said sprocket-engaging part, at the top of said sprocket-engaging part, said rib having a horizontal surface; and at least one concavity in the sprocket-engaging part, said concavity being defined at least in part by said rib.

2. The metal core as set forth in claim 1, wherein the metal core defines a length, and said horn members each have one end protruding from said sprocket-engaging part and from said wing parts in a direction transverse to the length of the metal core, the ends of the horn members protruding in opposite directions from one another, each horn member having an opposite end opposite to the protruding end, said opposite end terminating short of said sprocket-engaging part and said wing parts in a direction transverse to the length of the metal core.

3. The metal core as set forth in claim 1, wherein the metal core defines a length and a width, and said horn members have inner surfaces adjacent to and extending generally upward from said sprocket-engaging part, said inner surfaces defining an angle with the direction of the width of the metal core.

4. A metal core for a rubber crawler comprising:

a sprocket-engaging part at the center of the metal core for engaging a sprocket, the metal core defining a length, and said sprocket-engaging part having a top and being semicircular in cross-section transverse to said length;

horn members positioned laterally outside said sprocket-engaging part, said horn members defining traveling surfaces for traveling on a rotating wheel;

wing parts extending laterally from outside said horn members;

a rib integral with said sprocket-engaging part, at the top of said sprocket-engaging part; and at least one concavity in the sprocket-engaging part, said concavity being defined at least in part by said rib.

* * * * *